(12) United States Patent
Kyyhkynen

(10) Patent No.: US 6,403,964 B1
(45) Date of Patent: Jun. 11, 2002

(54) MODULAR IMAGING APPARATUS

(75) Inventor: Arto Kyyhkynen, Helsinki (FI)

(73) Assignee: Simage Oy, Espoo (FI)

( * ) Notice: Subject to any disclaimer, the term of this patent is extended or adjusted under 35 U.S.C. 154(b) by 0 days.

(21) Appl. No.: 09/197,606

(22) Filed: Nov. 23, 1998

(30) Foreign Application Priority Data

Dec. 18, 1997 (GB) .............................................. 9726770

(51) Int. Cl.$^7$ ................................................ G01T 1/24
(52) U.S. Cl. .................................. 250/370.09; 250/366
(58) Field of Search ........................... 250/370.09, 366, 250/376, 367, 370.08, 370.11, 332

(56) References Cited

U.S. PATENT DOCUMENTS

| | | | |
|---|---|---|---|
| 4,810,881 A | * 3/1989 | Berger et al. | .......... 250/370.01 |
| 5,065,245 A | 11/1991 | Carnall, Jr. et al. | |
| 5,381,014 A | * 1/1995 | Jeromin et al. | ........ 250/370.09 |
| 5,629,524 A | 5/1997 | Stettner et al. | |
| 5,635,718 A | 6/1997 | DePuydt et al. | |

FOREIGN PATENT DOCUMENTS

| | | |
|---|---|---|
| EP | 0 245 147 | 11/1987 |
| EP | 0 421 869 | 4/1991 |
| EP | 0 429 977 | 6/1991 |
| EP | 0 577 487 | 1/1994 |
| EP | 0 657 938 | 6/1995 |
| GB | 2 289 983 | 12/1995 |
| GB | 2 305 096 | 3/1997 |
| GB | 2 315 157 | 1/1998 |
| GB | 2 322 233 | 8/1998 |
| WO | WO91/10921 | 7/1991 |
| WO | WO91/17624 | 11/1991 |
| WO | WO95/33332 | 12/1995 |
| WO | WO97/26677 | 7/1997 |

\* cited by examiner

*Primary Examiner*—Constantine Hannaher
*Assistant Examiner*—Albert Gagliardi
(74) *Attorney, Agent, or Firm*—Kenyon & Kenyon

(57) ABSTRACT

Radiation imaging apparatus includes a support structure for a number of modules which each in their turn support a number of imaging device tiles. An imaging device on each tile provides an array of radiation detector cells. With the modular construction, the apparatus can provide a large imaging array from a large number of individual tiles. The support structure may be located in or form part of an imaging cassette. The modules provide tile mounting locations in one or more rows for the imaging device tiles, whereby the tiles may be accurately mounted with respect the module and to each other prior to being mounted on the support structure. The tiles are mounted on the modules and the modules are mounted within the cassette in a removable manner to facilitate the replacement of faulty tiles when required and/or the replacement of tiles having different resolutions and/or specifications for different imaging applications. Various arrangements for electronically clustering tiles are provided.

40 Claims, 8 Drawing Sheets

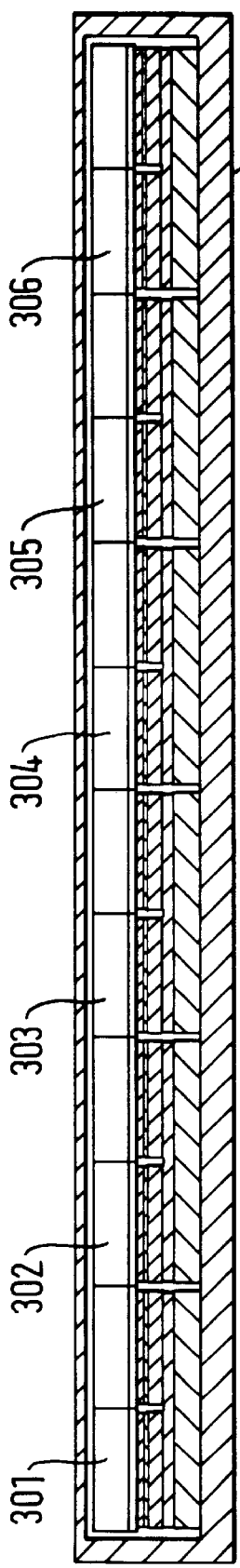
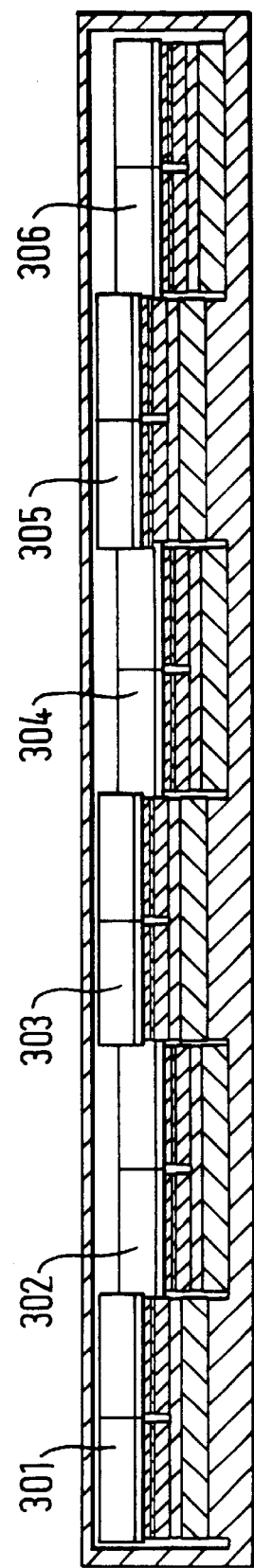
FIG. 8a
FIG. 8b

MODULAR IMAGING APPARATUS

FIELD OF INVENTION

The invention relates to imaging apparatus having a modular structure. In particular the invention relates to imaging apparatus comprising a plurality of imaging devices.

BACKGROUND TO INVENTION

The invention finds application to imaging apparatus for large area imaging using semiconductor imaging devices and is particularly suitable for high energy radiation imaging (i.e. radiation having energies in excess of 1 keV, such as X-rays).

Traditional arrangements for X-ray imaging, including cassette film, other modalities such as wire chambers, scintillating crystals or screens, (e.g. Sodium Iodide NaI), BGO (Bismuth Germanium Oxide) and CR plates (Computed Radiography), have been utilized over the past forty years.

More recently, semiconductor imaging devices have been employed, including CCD-based devices, both in stand-alone implementations and coupled to scintillating screens, silicon microstrip detectors and semiconductor pixel detectors.

Semiconductor pixel detectors, such as have been described in the Applicant's International patent application WO95/33332 incorporated herein by reference, based on ASIC (Application Specific Integrated Circuit) CMOS processing, can provide high spatial resolution, direct detection, compactness, high absorption efficiency and real-time imaging. However, limitations on ASIC CMOS technology (e.g. yield) limit the maximal size of monolithic detectors to a few square centimeters. Various methods of combining individual monolithic detectors have been, therefore, proposed. The major challenge is the formation of a large continuous imaging area without any blind regions.

One method of eliminating such inactive regions in the final image has been the use of software interpolation. However, this method does not recover lost information but only provides an approximation.

Other methods for combining monolithic detectors in large imaging areas without the presence of inactive regions have been proposed.

In the Applicant's International patent application WO 95/33332 mentioned above, a tiling approach is proposed where individual detectors are staggered on a mosaic in a manner that one third of the total desired area is imaged in a single exposure. Three different exposures, at different positions of the mosaic, are required. This approach is cost efficient as it reduces the total number of required detectors and allows for replacement of defective detectors. Nevertheless, this solution requires a moving device, translating the imaging area in two subsequent positions. A total of three snapshots are taken in order to provide substantially continuous coverage.

In European patent application EP-A-421 869, an approach to the joining of individual image detectors is described. The detectors are glued to a stepped support with a detector on a step extending beyond the edge of the step to partially overly a detector on the next lower step. Although this approach allows for large area continuous imaging, it provides a rigid device whose thickness increases with imaging area. Furthermore, as individual detectors are rigidly glued on the apparatus defective component replacement is not addressed.

Another approach to large area imaging is described in European patent application EP-A-577 487. This approach provides an imaging apparatus comprising several individual detector substrates arranged adjacent to each other and rigidly connected to each other by means of support substrates which overlap adjacent detector substrates. The detector substrates are rigidly connected to the support substrates by means of indium bumps. Although the total thickness of the apparatus is independent of the imaging area, the overall structure is, once again, rigid and does not allow for simple individual detector replacement. Furthermore, EP-A-577 487 is silent about possible practical difficulties in fabricating a large structure comprising an array of elements rigidly bump-bonded each together.

The Applicant's UK patent application GB-A-2,305,096 describes an approach to the mounting of imaging devices, for example of the type described in WO95/33332, on a support plane, in which imaging device is secured to a mount to form an imaging device tile, and then the tile is removably mounted on a support plane by means of screws, vacuum, or other fastening arrangements permitting non-destructive removable mounting of the imaging device tiles. However, individual mounting of the individual tiles is required, which can be a time consuming and difficult task for large arrays. Also, providing large numbers of electrical connections to the individual tiles for a large array can require the development of expensive support planes.

Accordingly, there remain problems to be solved regarding the large area imaging, such as facilitating the accurate relative positioning of large numbers of individual tiles on the support plane. Also, there is a need for structures which provide the basis for simplifying the arrangement of and connections to electronic components external to the tiles for enabling readout from the tiles.

The present invention seeks to facilitate the accurate mounting of individual tiles with respect to one another and to the master support plane.

Particular and preferred aspects of the invention are set out in the accompanying independent and dependent claims. Features from dependent claims may be combined with those of the independent claims in any appropriate manner and not merely in the specific combinations enumerated in the claims.

SUMMARY OF THE INVENTION

In accordance with one aspect of the invention, there is provided apparatus for imaging radiation, said apparatus comprising:
- a plurality of tiles, each tile comprising an imaging device having an array of radiation detector cells;
- a number of modules, each module supporting a plurality of said tiles; and
- a module support structure, said support structure supporting said module(s).

Thus, according to the invention, an imaging module can be provided for mounting a plurality of imaging devices for forming an imaging array, wherein the imaging module is configured to be mountable on a master support structure and configured to support at least one imaging device tile in a predetermined location. One or a plurality of modules can then mounted on a common module support structure, as required for a particular application.

This enables a modular arrangement of a plurality of tiles such that the tiles can be readily arranged with respect to one another and whereby the modules may be assembled with respect to one another to provide a large area imaging apparatus. The imaging apparatus according to the invention also provides a basis for simplifying the connection to and arrangement of circuit components external to the imaging devices as will be explained below with respect to preferred developments of the invention.

In a preferred embodiment, tiles are mounted on a module and then the modules are mounted on the support structure, for example for forming an imaging cassette. The modules provide a plurality of tile mounting locations in one or more rows whereby the tiles may be accurately mounted with respect the modules and to each other prior to being mounted on the master support structure.

Preferably, the tiles are mounted on the modules in a removable manner to facilitate the replacement of faulty tiles when required and/or the replacement of tiles having different resolutions and/or specifications for different imaging applications. Preferably, the modules are also mounted on the support structure in a removable manner permitting easy replacement of a complete module when required and/or the replacement of modules carrying tiles having different resolutions and/or specifications for different imaging applications.

In one embodiment, an imaging device has a two-dimensional array of radiation detector cells and a module supports a two-dimensional array of tiles.

In a preferred embodiment, a module comprises a board comprising, on a first surface thereof, an array of tile mounting locations, each mounting location comprising an arrangement of mounting location contacts for contacting corresponding tile contacts on a tile. The board is elongate and comprises two or more rows of mounting locations for supporting two or more rows of tiles. The board has, on the first surface, a circuit region not populated with the tiles. Preferably, the circuit region is adjacent one end of the board to maximise the size available for the imaging array. The circuit region can comprises control circuitry for controlling access to and output of signals from the imaging devices. Alternatively, or in addition, circuitry can be provided on a surface of the board, opposite to the first surface.

Thus, the module can comprises a board, for example a multilayer printed circuit board, having a first area with tile mounting locations and a second area for circuitry external to the tiles, including, for example, power supply circuitry, module controller circuitry and external interface circuitry. Preferably, the board is a multilayer printed circuit board, conductive tracks connecting the mounting location contacts to the circuitry. The provision of the circuitry in a predefined area of the module enhances the modularity of the apparatus and allows the tailoring of the detail design to suit particular applications and technologies.

In a preferred arrangement to enhance the performance of communications between the individual tiles and an external computer, tiles within a module are electrically grouped in clusters. Tiles within a cluster are preferably read out in series and one or more clusters are also readout in series, thus effectively forming larger clusters, termed megaclusters. In a preferred embodiment the megaclusters are read out in parallel. Advantageously, some of the clusters can be selectively de-activated, so that a megacluster can comprise fewer tiles, where it is desired to increase read out speed and smaller areas need to be imaged. In one embodiment, the outputs of the megaclusters of one module are multiplexed on the module so as to provide one output per module. Alternatively, or in addition, the outputs from different modules can be multiplexed in order to further reduce the overall number of signals to be digitized.

In one embodiment, an imaging device tile includes an imaging device and a mount, an image detecting plane of the imaging device being tilted with respect to a mounting surface of the mount, the mounting surface comprising tile electrical contacts interconnectable with corresponding mounting location contacts at a tile mounting location on the module. The mounting of the modules on the support structure are arranged such that the modules are tilted to compensate, at least partially, for an angle between the image detector planes and a plane of an imaging cassette in which the apparatus is mounted.

A preferred form of imaging device comprises one or more detecting layers sensitive to radiation and one or more readout layers, the detecting layer(s) and the readout layer(s) being joined together with an image detecting plane or planes of the detector layer(s) substantially parallel to the readout layer(s). Preferably, the detecting layer extends beyond the readout layer on at least two edges, a further edge providing wire connections between the readout layer and the mount. A wedge can be provided between the imaging device and the mount to maintain an angle between the image detecting plane of the imaging device and the mounting surface of the mount.

A preferred embodiment of the invention comprises modules which are elongate and the support structure supports a one-dimensional array of modules aligned next to each other.

The imaging devices of adjacent modules can be in mechanical contact with each other. Alternatively, adjacent modules are alternately displaced in a first direction and in an opposite direction substantially perpendicular to the plane of the module.

The apparatus can also include an interface board comprising interface circuitry, with the modules electrically connected to the interface board. The interface circuitry comprises circuitry for multiplexing outputs from respective modules.

The invention also provides an imaging cassette including apparatus as defined above. The imaging cassette can include an external connector for connecting the imaging cassette to an external processor. The support structure can be integral to a housing of the cassette or can be contained within the housing of the cassette. Where the cassette is to replace a conventional film cassette for X-ray imaging, the cassette comprises a housing having an X-ray transmissive surface.

An embodiment of the invention can enable, for example, the provision of an imaging cassette having a total imaging area of, say, approximately 100×200 mm and a thickness of 2.5 cm or less. The cassette can be portable and lightweight. Also defective tile replacement can be facilitated. Given a pixel size of 35 micrometers, an imaging cassette of 100× 200 mm could comprise about 16 million pixels. Pixel digitisation with 10 or 12 bits resolution can be provided by 16 bits of computer memory per pixel. Fast data transfer from cassette to computer can be achieved, for example with a data transfer time of less than 5 seconds.

The invention further provides an imaging system including apparatus as described above and control electronics and/or an image processor for processing signals output from the cassette. The cassette output can be digitized after multiplexing of the signals, for example in an external computer. Alternatively, it can be part of the interface circuitry, for example on the interface board or on the module(s). Analog and/or video digitization can be used.

In accordance with another aspect of the invention, there is provided a module for use in apparatus as described above, the module enabling the mounting an array of tiles, each tile comprising an imaging device having an array of radiation detector cells and having a plurality of tile contacts on a mounting surface thereof. The module comprises:

a board having, on a first surface thereof, an array of tile mounting locations, each mounting location comprising an arrangement of mounting location contacts for contacting corresponding tile contacts on a tile and means permitting removable mounting the tile at the tile mounting location;

circuitry for controlling access to and output of signals from respective tiles when mounted at the tile mounting locations; and electrical connections from the mounting location contacts to the circuitry; and means for mounting the module on a support structure for a plurality of such modules.

In accordance with a further aspect of the invention there is provided a method of forming an imaging array for imaging radiation comprising:

mounting a plurality of tiles on an imaging module, each tile comprising an imaging device having an array of radiation detector cells; and mounting a plurality of the modules on an imaging support, each module supporting an array of the tiles.

In accordance with yet a further aspect of the invention, there is a provided a method of manufacturing an imaging device tile, the method comprising:

supporting an imaging device on a tile mount at a predefined angle within a mould, filling a volume between imaging device and the tile mount with filler material; and removing the imaging device tile from the mould.

BRIEF DESCRIPTION OF THE DRAWINGS

FIGS. 8a and 8b are schematic cross-sectional side views of two embodiments of a cassette.

DETAILED DESCRIPTION

Exemplary embodiments of the invention are described hereinafter, by way of example only, with reference to the accompanying drawings.

Figure 1:
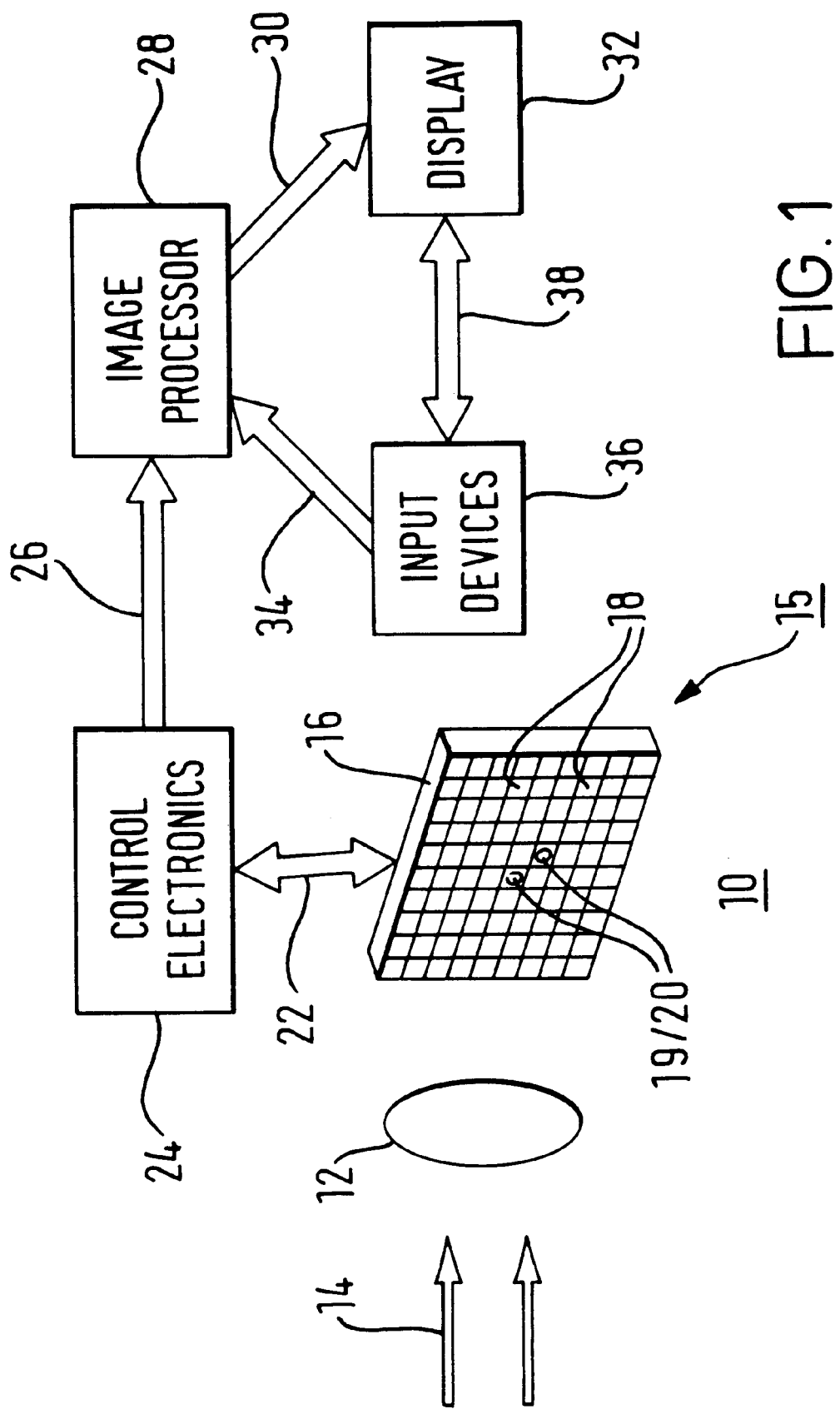
FIG. 1 is a schematic representation of an imaging system.

FIG. 1 is a schematic representation of an example of an imaging system 10 as described in the Applicant's International application WO 95/33332 for radiation imaging of an object 12 subjected to radiation 14. The radiation may, for example, be X-ray radiation and the object 12 may, for example, be a part of a human body. The imaging device comprises an imaging array 15 including at least one Active-pixel Semiconductor Imaging Devices (ASID) 16. Although only one ASID 16 is shown schematically in FIG. 1, the imaging array will typically include a plurality of imaging devices 16. Each imaging device 16 provides a plurality of image, or pixel cells 18. Each imaging device directly detects high energy incident radiation such as X-rays, γ-rays, β-rays or α-rays and accumulates at each pixel cell, by means of a randomly accessible, active, dynamic image cell circuit on or adjacent to a corresponding image detector cell, values representative of the radiation incident at that image cell.

The imaging device 16 can be configured as a single semiconductor substrate (e.g., silicon) with each image, or pixel cell comprising an image detector cell 19 and an active image cell circuit 20, or alternatively on two substrates, one with an array of image detector cells 19 and one with an array of active image cell circuits 20, the substrates being mechanically connected to each other by, for example, microbumps (bump-bonds).

Figure 2:
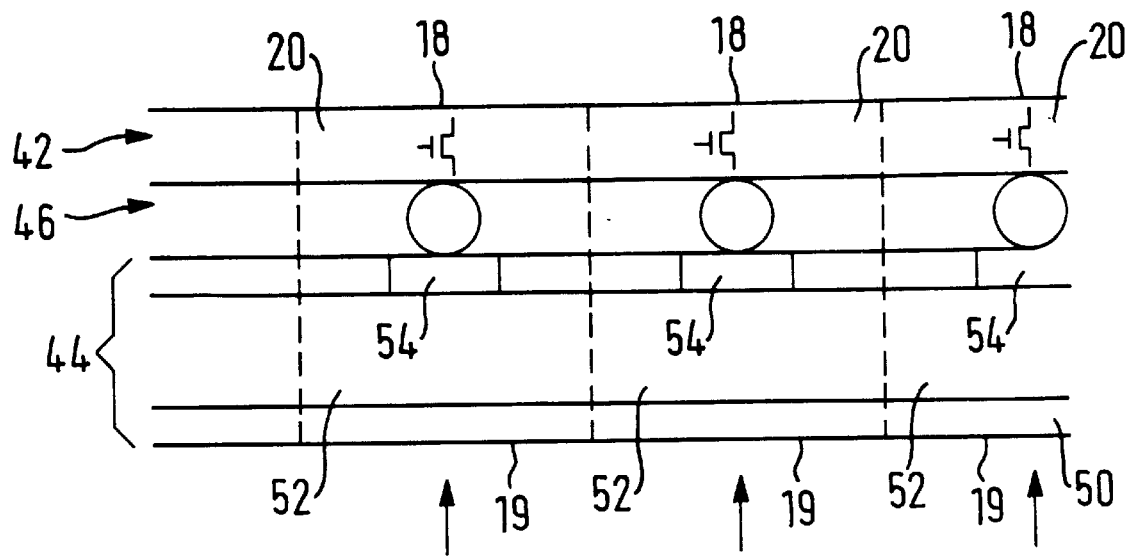
FIG. 2 is a schematic partial cross-section of an imaging device.

FIG. 2 is a schematic partial cross-sectional representation of a two-substrate imaging device showing the connection of the substrates. Individual detector cells 19 of an image detector substrate 44 are connected to corresponding cell circuits 20 of a readout substrate 42 by means of microbumps 46. The cell circuits 20 are schematically represented within the substrate 42 by means of the symbol of a FET.

The detector substrate 44 is provided with a continuous electrode 50 on the side of the substrate 44 which is exposed to incident radiation. In FIG. 2, therefore, the incident radiation is assumed to arrive in an upwards direction. On the rear surface of the detector substrate 44, a plurality of detector cell electrodes 54 are provided. It is the array of detector cell electrodes 54 which effectively defines the individual image detector cells 19 within the detector substrate 44. A bias voltage is applied to the continuous electrode 50 and image cell detection zones 52 are defined between the continuous electrode 50 and the respective detector cell electrodes 54. Each of the detector cell electrodes is electrically and mechanically coupled to a respective cell circuit 20 by a respective microbump 46. It will be appreciated that the representation in FIG. 2 is highly schematic, and not to scale.

When a photon is photo-absorbed at a detector cell 19 creating an electric charge or when a charged radiation ionizes the detection zone 52 of the detector substrate 44 at a detector cell 19, an electric pulse flows from the detector substrate detection zone 52 to the cell circuit 20 for that image cell 18.

A value associated with the electric pulse is then accumulated in an active circuit element, either directly as a charge value or as an equivalent voltage or current value such that new charge created from subsequent incoming radiation is added continuously. Examples of possible accumulating devices are an integrated capacitor or the gate of an integrated transistor. The charge accumulation process in a cell circuit 20 continues until control signals are issued from control electronics 24 to start a process of reading out information by addressing each cell circuit 20, effectively in a random access manner. During readout of the accumulated charge values, charge continues to be accumulated. Cell circuits 20 may selectively be reset after readout to discharge the charge accumulation circuit elements, and only then are image cells inactive for a very short time with practically no dead time.

Thus, the cell circuits 20 are provided for each image cell 18 to accumulate charge created in the detector cell when, for example, a photon or a charged particle of radiation is incident on the detection zone of that detector cell 19. An active cell circuit 20 and the detector cell 19 can be of the order of a few tens of microns in size (e.g., 10–50 μm).

A schematic representation of an example of a cell circuit is described with reference to FIG. 3. This example of a cell circuit uses field effect transistors (FETS) arranged as a cascode connected amplifier. FET M11A 70, and in particular the gate thereof, forms charge accumulation circuitry. FET M11B 72 forms readout circuitry. FET M11C 77 forms reset circuitry. VBIAS 60 is a bias voltage input across the depletion zone forming a detector cell 19 of the image cell. The detector cell 19 is represented by a diode symbol D11. In the cell circuit itself, SIGOUT 62 is an analog signal output and VANA 64 an analog power supply input. RES-R-1 66 is a reset input and ENA-R-1 68 is an enable input for the cell circuit.

Charge generated in the detector cell 19 in response to incident radiation is automatically accumulated in the gate of a transistor M11A 70 when both the RES-R-1 66 and ENA-R-1 68 inputs are low. To read the image cell, ENA-R-1 68 is taken to a high state, which allows current to flow from the transistor M11A 70 through the transistor M11B 72 to SIGOUT 62. The cell circuit is reset by taking RES-R-1 66 to high, whereupon after RES-R-1 66 has been at high for merely a few microseconds, any accumulated charge will have been removed from the gate of the transistor M11 A70. Immediately after RES-R-1 66 goes to a low level, charge can begin to accumulate at the gate of the transistor M11A 70. If no reset pulse is supplied to the reset input RES-R-1 66, then it is to be noted that a reading operation when the enable input ENA-R-1 68 goes high does not destroy the charge but instead merely causes a current flow directly proportional to the accumulated charge. This allows multiple readings without resetting.

Figure 3:
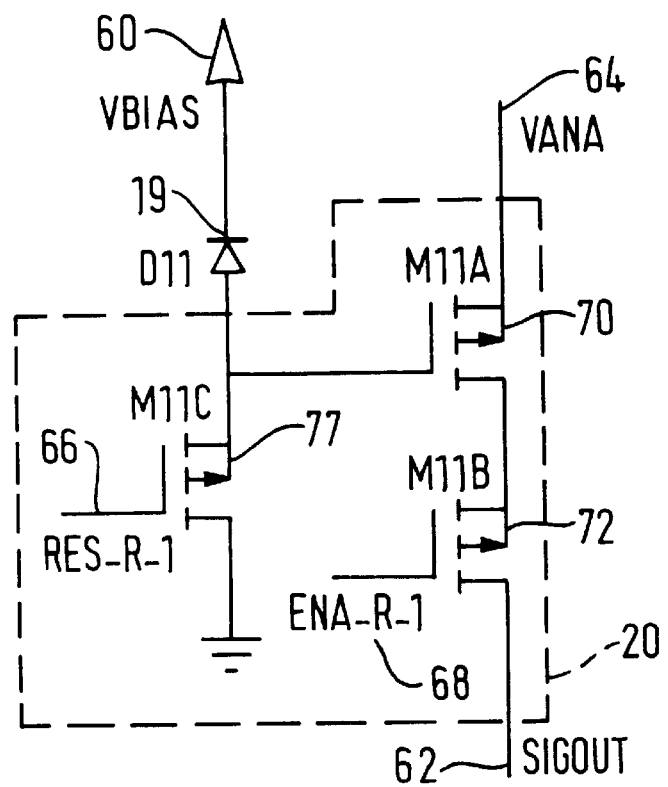
FIG. 3 is a schematic representation of an image cell circuit.

In the example shown in FIG. 3, charge accumulation ability can be maximised by arranging that the gate capacitance of a charge accumulation transistor M11A 70 forms substantially (say greater than 90% of) the input node capacitance (total capacitance) of the detector cell 19, the charge accumulation circuitry 70, the readout circuitry M11A 72 and reset circuitry 77 of FIG. 3 and minimizing the parasitic or unwanted capacitance of all other circuit (and detector) components. For a 35 μm by 35 μm cell circuit, for example, the M11A 70 capacitance can be 2 pF and the FET gate voltage dynamic range can be at least 2 Volts. This corresponds to about 25,000,000 electrons in storage capacity.

Returning to FIG. 1, the control electronics 24 includes processing and control circuitry, which is connected to the cell circuits 18 on the semiconductor substrate as represented schematically by the two-way arrow 22. The control electronics 24 enable the cell circuits 20 associated with individual image cells 18 to be addressed (e.g., scanned) for reading out charge accumulated in the cell circuits 20 at the individual image cells 18. The charge read out is supplied to Analog to Digital Converters (ADCs) for digitisation and Data Reduction Processors (DRPs) for processing the binary signal.

The control electronics 24 is further interfaced via a path represented schematically by the arrow 26 to an image processor 28. The image processor 28 includes data storage in which it stores the digital value representative of the charge read from each image cell along with the position of the image cell 18 concerned. For each image cell 18, each charge value read from the image cell is added to the charge value already stored for that image cell so that a charge value is accumulated. As a result, each image can be stored as a representation of a two-dimensional array of pixel values which can be stored, for example, in a database.

The image processor 28 can access the stored image data in the database to select a given image (all the array) or a part of the image (a sub-sample of the image array). The image processor 28 reads the values stored for the selected image positions and causes a representation of the data to be displayed on a display 32 via a path represented schematically by the arrow 30. The data can of course be printed rather than, or in addition to being displayed and can be subjected to further processing operations. For example, background and noise can be subtracted as a constant from each pixel charge value. This pedestal and/or background subtraction is possible if prior to image taking an "empty" image is acquired. For each pixel a background value is deduced and can be subtracted accordingly.

User input devices 36 connected via paths represented schematically by the arrow 34 and possibly interacting with the display 32 as represented schematically by the double arrow 38 can be used to control the operation of the imaging system. The user input devices 36 can include, for example a keyboard, a mouse, etc.

In the Applicant's co-pending UK Patent application GB 9614620.4, an approach is described for providing continuous coverage while, at the same time, preserving the option to replace individual detectors nondestructively. Specifically, this approach applies to hybrid imaging devices comprising a semiconductor substrate 44, bump-bonded to an ASIC CMOS crystalline silicon readout chip 42 as described in the Applicant's International patent application WO 95/33332.

Figure 4:
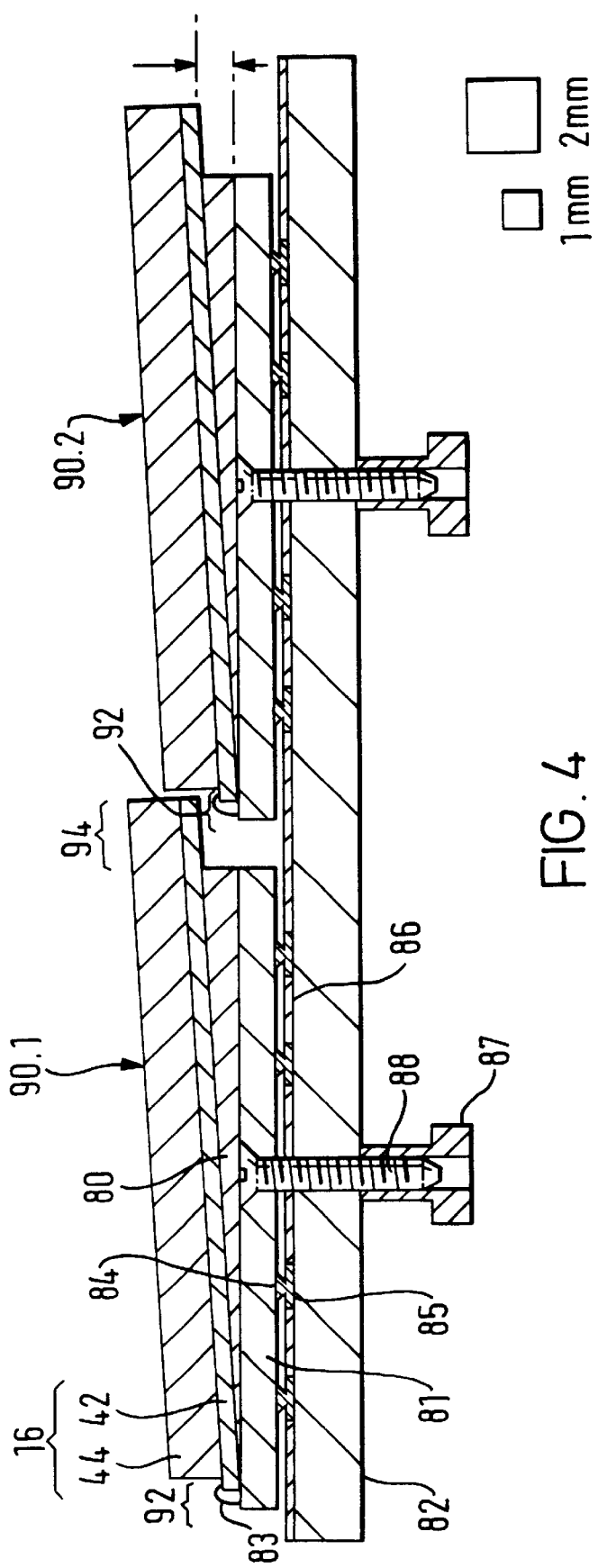
FIG. 4 is a schematic representation of a proposal for an imaging tile.

FIG. 4 of the accompanying drawings corresponds to FIG. 3B of GB 9614620.4. Here the imaging device 16 comprising the bump-bonded detector-readout structure 44/42 described above with reference to FIGS. 1–3 is mounted on a Printed Circuit Board (PCB) mount 81 to form an imaging device called a tile 90. The detector-readout structure 44/42 is tilted with respect to the PCB 81 by means of a wedge 80 or an equivalent structure. In this manner, an active region 94 of a tile (say 90.1) covers an inactive region 92 of a subsequent tile (i.e. the adjacent tile 90.2). A region 92 of each tile is reserved for wire connections 83 between the PCB 81 and the readout substrate 42. Electrical contact between the master support 82 and the PCB 81 is achieved by means through the connection of conductive bumps, or balls, 84 and conductive rings or pads 85. The rings 85 are located at desired positions by means of holes in an insulating layer 86. Below the rings 85 are conductive contacts. The tile 90 is mounted on the master support 82 by means of a screw 88 which projects from the tile mount PCB 81 and a nut 87. Alternatively, other removable fastening means such as zero insertion force connectors, clips, vacuum, etc., can be used removable to secure the tiles on the support.

Image continuity along the direction perpendicular to the plane of FIG. 4 requires a detector active up to the two edges along this direction. The Applicant's co-pending UK patent application GB 9703323.7 proposes a solution to this whereby the detector substrate 44 extends over the readout substrate 42 on all three sides except the side, or region, 92.

FIG. 5 comprises schematic side (a), plan (b) and functional (c) diagrams of an example of an imaging module of an embodiment of the invention. An embodiment of the invention seeks to provide a module suitable for an imaging cassette for an imaging application which comprises an array of imaging tiles, for example as described above with reference to FIGS. 1–4 while reducing the problems of mounting those tiles in the cassette.

Accordingly, an embodiment of the invention provides a modular construction whereby a cassette may contain one or more modules, each module supporting a plurality of imaging tiles. In a preferred embodiment of the invention, a module resembles a ladder in that one or more rows of tiles are provided on the module. Indeed, the module is also known as a ladder.

Thus, in a preferred embodiment of the invention, an imaging cassette, which can be configured as a replacement for a conventional X-ray film cassette, comprises a collection of one or more modules, each module comprising a collection of one or more imaging tiles mounted thereon. In a preferred embodiment, the tiles are mounted on the module in a non-destructive removable manner by means of removable fastenings, for example screws and nuts, and the modules are mounted in the cassette in a non-destructive removable manner, for example, by screws and nuts. This facilitates the replacement of tiles and modules in use, for example where a tile or module is faulty, and/or to move the tiles or modules between different cassettes and/or change the imaging characteristics of tiles and/or modules within a cassette.

Figure 5A:
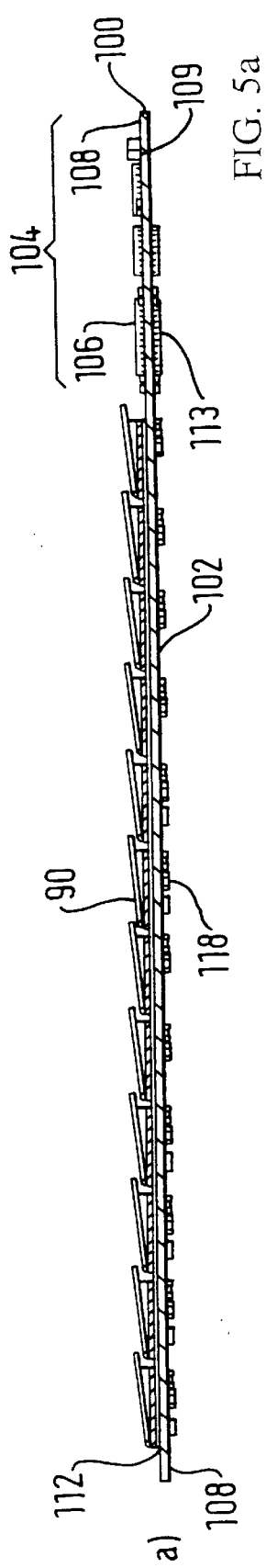
FIGS. 5a, 5b and 5c respectively illustrate schematic side, plan and functional diagrams of an example of an imaging module according to an embodiment of the invention.
Figure 5B:
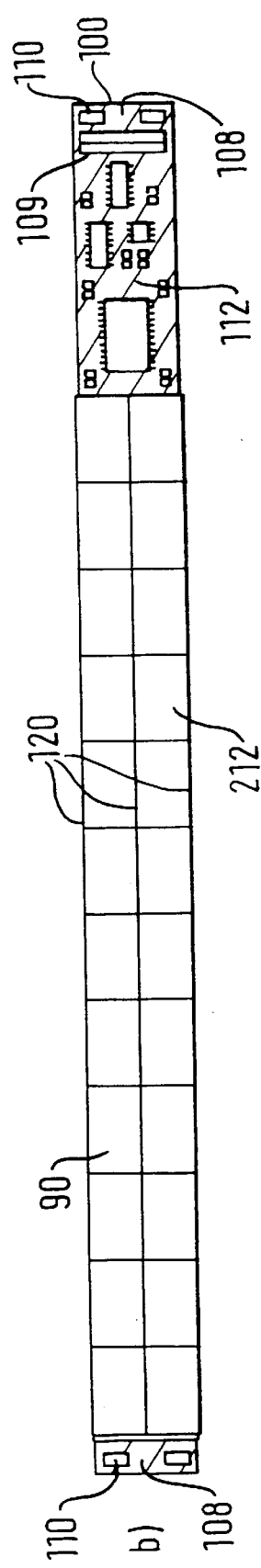

FIGS. 5a and 5b depict an example implementation of this preferred embodiment. The example of a ladder module 100 comprises 24 imaging tiles 90 mounted on a multilayer printed circuit board 102. The tiles 90 are arranged in a two dimensional mosaic of two rows and twelve columns on the upper surface, as seen in FIG. 5a, of the module board 102. A region 104 of the module 100 is reserved on the module board 102 for electronic components 106 such as analog electronics, multiplexers, preamplifiers, analog to digital converters, etc., as required for a particular application. Arrangements, for example apertures or openings 110 at the extreme ends 108 of the module board 102, are provided for receiving screws or other fastenings (not shown in FIG. 5) for mounting the module 100 on a cassette support (not shown in FIG. 5). Separate electrical connections arrangements such as cable connectors 109, edge connectors, ribbon cables, etc, can be provided. Alternatively, the module board 102 could be provided with combined mechanical and electrical connector arrangements, for example zero insertion force connector(s), other pin and/or socket connector arrangements etc., which serve to removably locate the board mechanically and provide electrical connections. An insulating material 112 layer separates the tiles 90 from module board 102. The insulating layer 112 is preferably no more than 1 mm thick. Holes 85 (see FIG. 6) are provided, for example by engraving, in the insulating layer 112 for locating conductive rubber pads or rings 86 (see FIG. 6) or other electrically conductive elements, preferably resilient conductive elements, by means of which bump-shaped contacts 84 (see FIG. 6) on the tile 90 can be electrically (power) and electronically (signals) connected to contacts and conductive paths on and in the module board 102. Where conductive rubber pads 86 are used, the rubber thickness is preferably less than under 0.5 mm.

Analog electronic components 113, such as switches, capacitors, coils etc, are preferably placed on the lower surface, as shown in FIG. 5a, of the module board, These components serve, for example, in reducing or eliminating noise associated with the DC voltage of the tile electronic components.

The choice of two rows of tiles 90 on a module 100 in the present embodiment is preferred as it provides at least one free edge for each tile 90, thus facilitating tile replacement and, at the same time, providing enough space at the region 104 for mounting the electronic components 106. It should, however, be noted that a number of rows of tiles 90 other than two could be used in other embodiments.

In this embodiment, the tiles 90 are arranged electrically and electronically grouped in clusters 114 such that individual tiles within each cluster are read out in series only. The individual clusters 114 can be grouped together to form so-called megaclusters 116 so that all tiles in a megacluster are effectively readout serially. Separate megaclusters are then readout in parallel. The conductive paths from the tile location contacts to the electronic circuitry are formed by conductive tracks on layers in the multilayer circuit board 102. Connections between layers are provided by plated through holes in accordance with conventional multilayer circuit board technology. Sensitive signals are allocated a separate layer within the circuit board and can be shielded by shielding layers.

Figure 5C:
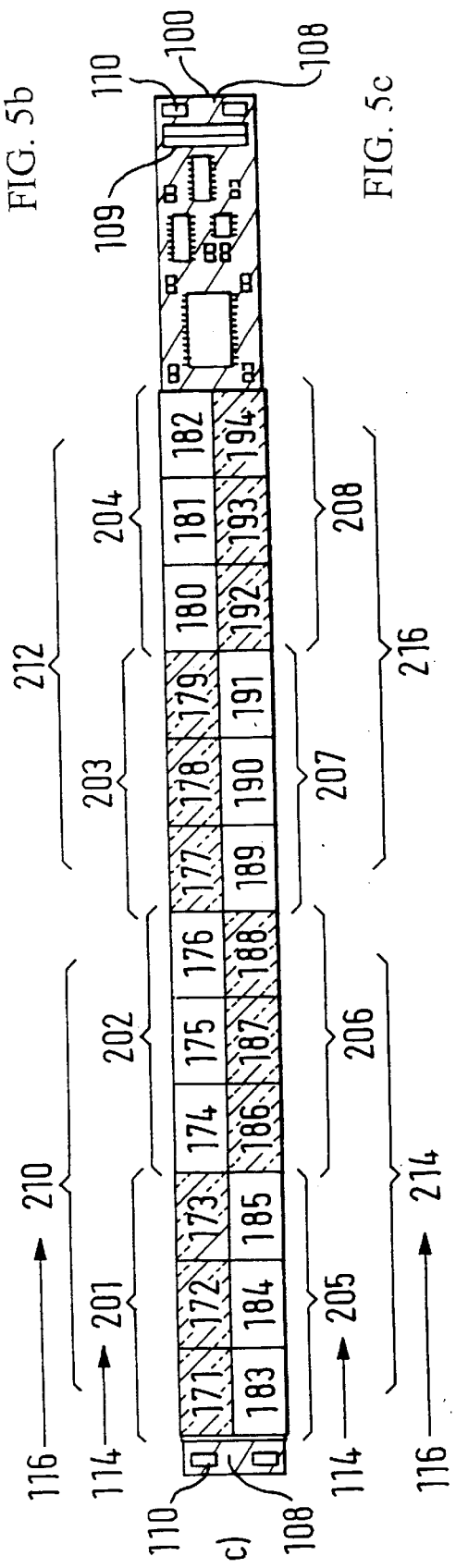

In the example implementation of FIG. 5c, each cluster 114 comprises three tiles and there are a total of eight such clusters. Specifically, tiles 171, 172, 173 are cascaded in cluster 201, tiles 174, 175, 176 are cascaded in cluster 202, tiles 177, 178, 179 are cascaded in cluster 203, tiles 180, 181, 182 are cascaded in cluster 204, tiles 183, 184, 185 are cascaded in cluster 205, tiles 186, 187, 188 are cascaded in cluster 206, tiles 189, 190, 191 are cascaded in cluster 207 and tiles 192, 193, 194 are cascaded in cluster 208.

Clusters 201 to 208 are then paired to form four megaclusters 116 of six tiles each, the six tiles within a megacluster being read in series and the four megaclusters in parallel. Specifically, clusters 201, 202 form one megacluster 210, clusters 203, 204 form another megacluster 212, clusters 205, 206 form another megacluster 214 and clusters 207, 208 form another megacluster 216.

In another example implementation, the clusters 201, 204, 205 and 208 are deactivated and only clusters 202, 203, 206 and 207 are active. The imaging area can thus be reduced to increase readout speed by effectively reading only three tiles in series. The choice between large or small imaging areas, is implemented electronically by means of switches in the electronic circuitry 106 and does not require any dismounting of the imaging tiles 90.

In a specific implementation of the module 100 of FIG. 5, the tiles 90 provide an imaging area of, approximately, 18.13×9.85 mm. The pixel pitch, excluding some edge pixels is 35 micrometers. There are 256 rows and 512 columns of pixels, hence a total of 131,072 pixels per tile. The detector substrate extends beyond the edges of the readout substrate chip except for side near region 92 of tile (see FIGS. 4 and 6). Hence, the detector layers can be brought into physical and mechanical contact along the upper and lower edges of the module 100 as seen in FIG. 5b. In other words, the edges 120 of the detector substrates of adjacent tiles on a module 100 and adjacent tiles of a cassette, when modules are arranged side by side (see FIG. 7) in a cassette, can be in physical (mechanical) contact (see FIG. 8a).

The extent by which the detector substrate 44 extends beyond the readout substrate 42 on edges except edge 92 is determined by the precision with which the detector edges are themselves defined. Thus, the detector substrate edges are preferably defined to a high precision, for example 200 micrometer precision. In this case, the detector substrate extends beyond the readout substrate by at least this amount. More preferably, the precision should be 100 micrometers and the detector substrate extends beyond the readout substrate edges by at least this amount. Even more preferably the precision should be 50 micrometers and the detector substrate extends beyond the semiconductor substrate edges by at least this amount. Even more preferably, the precision should be 10 micrometers and the detector substrate extends beyond the semiconductor substrate edges by at least this amount. Detector polishing can be employed to this end. It should be understood here that the references to the semiconductor substrate edges relate to at least the two edges adjacent to the region 92 and possibly to the edge at the opposite end of the imaging device 16 to the region 92.

In another embodiment, a thin insulating film, for example a mylar film, is placed between adjacent detector surfaces in direct contact (i.e. at 120 in FIG. 5b). Preferably, this film has a thickness of 10 micrometers or less. More preferably, the film thickness is 5 micrometers or less. Yet more preferably, the film thickness is 1 micrometer or less.

In an alternative embodiment, the modules 100 can be positioned in an alternating up and down configuration (see FIG. 8b) with one module being offset relative to each of the or each immediately adjacent module along the direction perpendicular to the module plane by an amount slightly larger than the detector thickness. In this manner, the detector substrates 44 do not need to be in physical contact with one another, but rather they lie slightly under or over each other. The overlap of the detector substrates 44 needs to be no more than a few micrometers, typically less than 300 micrometers overlap. As the detector substrate thickness can typically be about 1 mm, the additional thickness required for the cassette is insignificant.

Internal tile alignment is explained with reference to FIG. 6. The detector substrate 44 and readout substrate 42 are bonded together via microbumps as described with reference to FIG. 2. The resulting imaging device 16 is then accurately mounted on the tile mount PCB 81 with a screw 88 arranged in a hole in the tile PCB and the end of the screw projecting downwards. The mounting is achieved by means of a jig and/or mould. Preferably, a two piece aluminum mould, machined with mechanical accuracy of 50 micrometers is used. The mould is closed and the volume 80 between imaging device 16 and the tile mount 81 is then filled with epoxy resin. Regions of the mould are covered with silicon rubber to protect detector-CMOS top surface and PCB bottom surface from epoxy leaks. The angle subtended by the planes of imaging device 16 and tile mount 81, in other words the angle of insertion of wedge 80, should be as small as possible in order to minimise parallax error. Nevertheless, if this angle is made too small, the readout substrate 42 in the region 94 will be too close to the region 92 of a subsequent tile provoking electrical instability. In the present example implementation, the angle of insertion is 5 degrees. The use of a jig and mould enables this angle to be determined with a high precision. Preferably this precision should be better than 1 degree. More preferably, this precision should be better than 0.5 degrees. Even more preferably, this precision should be better than 0.1 degrees. However, differences in the angles between tiles can be corrected for in the software calibration of the imaging devices.

Figure 6:
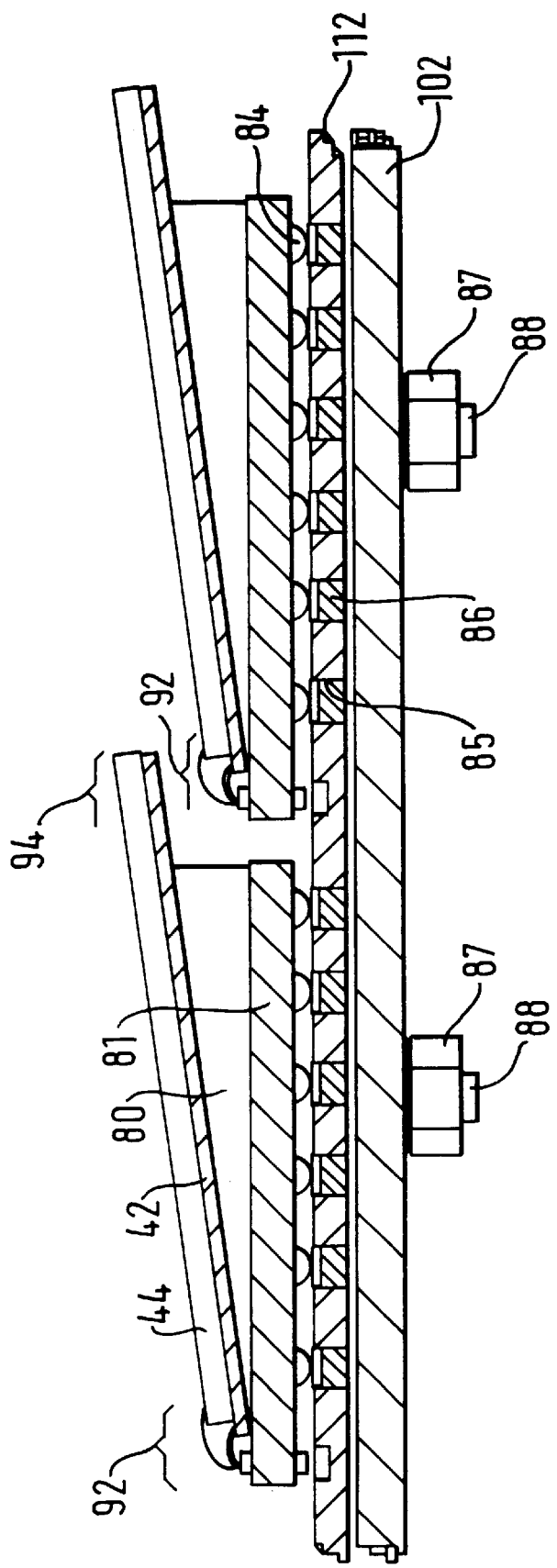
FIG. 6 is a schematic side view illustrating the relative placement of two imaging device tiles.

The alignment between the imaging devices 16 and the tile mount 81 along the direction perpendicular to the paper of FIGS. 5a and 6 is ensured by the use of the jig and mould. It is required that the tile mount be completely covered by the detector in the direction perpendicular to the plane of FIGS. 5a and 6. In other words, the detector edges 120 extend beyond underlying tile mount edges. In this direction, i.e. the direction perpendicular to the edges 120 of FIG. 5b, the tile mount PCB is narrower than the detector substrate 44 by approximately 150 microns. Accordingly, precise location of the detector edges with respect to the edge pixels is important.

FIG. 6 also shows the mounting of the tile PCB 81 on the module support 102 by means of screws 88 and nuts 87 and electrical and electronic connections by means of bump-shaped contacts 84 on the tile PCB and conductive circular pads 86, located in holes 85 in the insulating layer 112, on the module support 102.

As mentioned above, in the preferred embodiment of the invention, the module substrate 102 is a multilayer PCB capable of routing signals and power to the tiles. For example, the number of layers can be six or more. PCB layout design provides for placement of noise filtering capacitors at various points of the module PCB. Ground planes are also provided to protect noise sensitive signals. Preferably, each noise sensitive signal should have its own layer.

Figure 7:
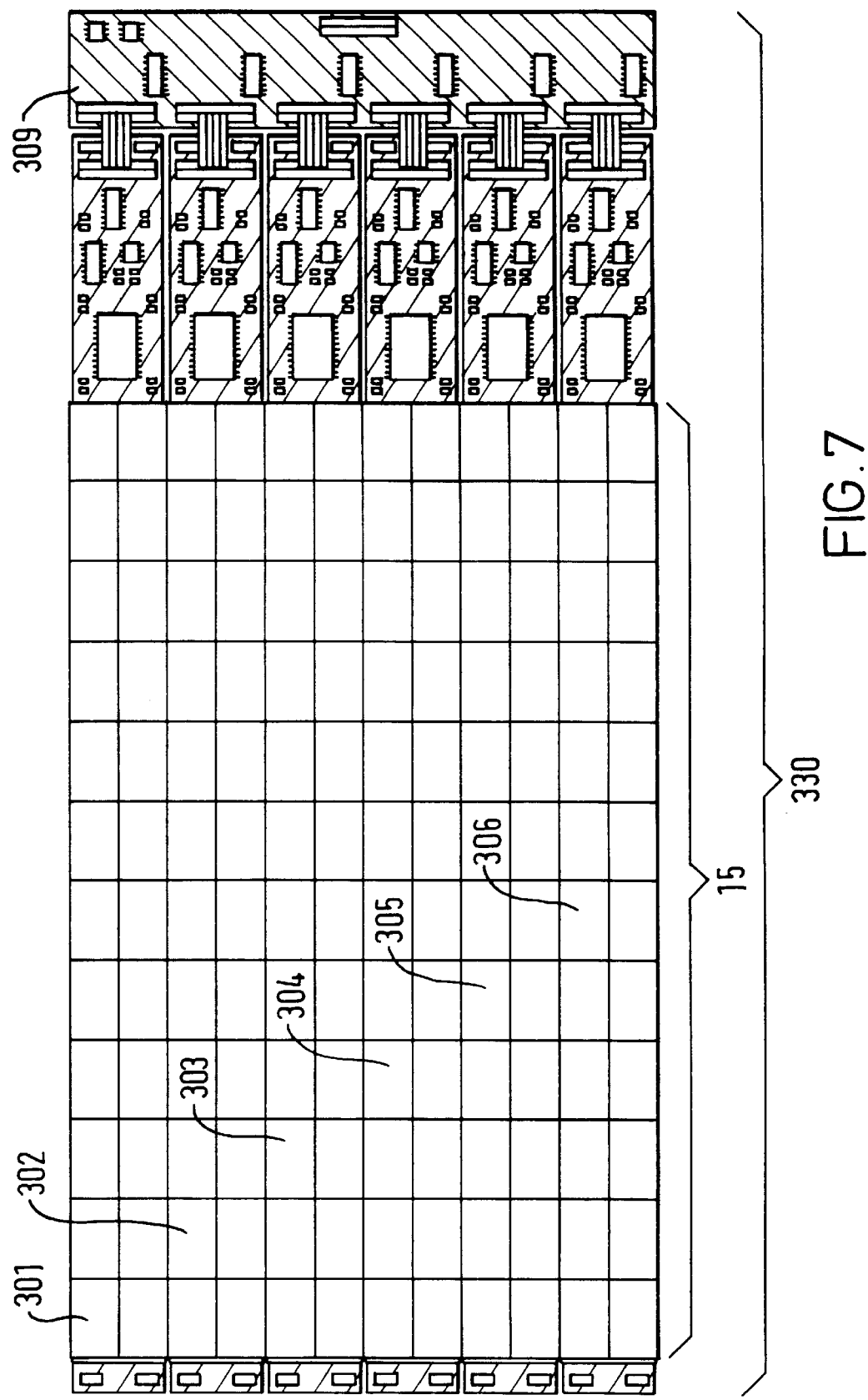
FIG. 7 is a schematic plan view of an imaging cassette.

In the preferred embodiment of the invention, modules are mounted on a support structure to form a large rigid assembly, or cassette 330, forming a large active imaging area 16 as represented in FIG. 7. Examples of cassette structures are shown in FIGS. 8a, 8b, 9 and 10.

Preferably, the modules are placed in parallel and in mechanical contact. An example implementation of this embodiment of the invention is depicted in FIGS. 7 and 8a. In this example, six modules 301, 302, 303, 304, 305, 306 are placed in parallel and in mechanical contact along their long edges, to form a large imaging surface 15 of approximate area 217.6×115.6 mm.

In an alternative embodiment, the modules 100 can be positioned in an alternating up and down configuration, as represented in FIG. 8b, with one module being offset relative to the or each immediately adjacent module along the direction perpendicular to the module plane by an amount slightly larger than the detector thickness. In this manner, the detector substrates 44 do not need to be in physical contact with one another, but rather they lie slightly under or over each other.

Figure 9:
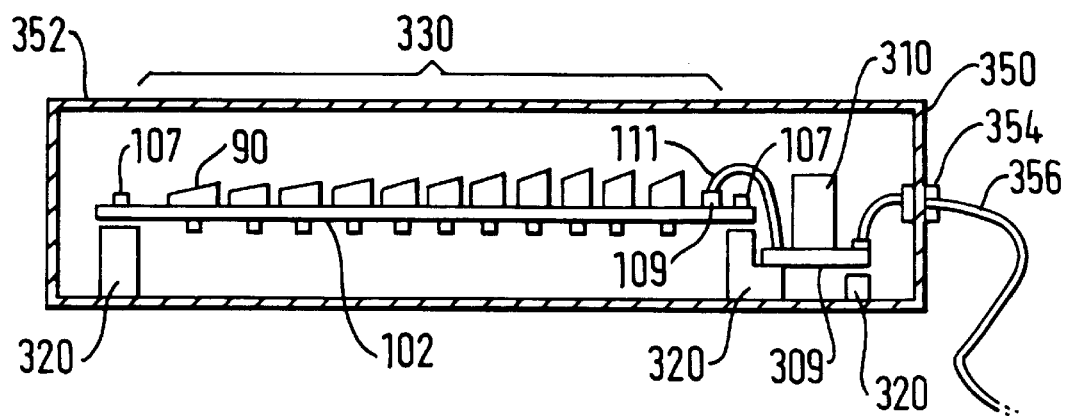
FIG. 9 is another cross-sectional side view of a cassette.

FIG. 9 is a further cross-sectional view of a cassette. This shows one module board 102 mounted on the module support structure 320 within a cassette 330 by means of screws 107 passing through the apertures 108 in the module board. Screws can be provided at one or both ends of the module board. Where screws are provided at one end of the board, an inter-engaging structure on the module support 320 for the other end of the board can be provided. The module support can be pre-threaded to receive the screws, or can be secured by means of a separate nut. Spaces or other mechanisms can be provided for adjusting the relative position of the module and the module support in order, for example, to tilt the module to correct parallax error as described below. For example, adjustable mechanical supports can be provided to adjust the mechanical position and to correct detector angle from 5 to 2.5 degrees and to adjust all of the modules in a cassette at the same time at one end, or at both ends of the module array. Preferably, the apertures 108 in the modules are elongate as shown in FIG. 7 to facilitate adjustment of the modules and also to facilitate installation and removal of the modules. Thus, for example, to install a module in the middle of the module array, the fixing screws for the surrounding modules can be loosened and moved away from the position of the new module which can then be mounted, and the screws tightened. Subsequently, the surrounding modules an be moved back towards the newly installed module and the screws tightened. Similarly, to remove a centrally located module, the screws for mounting the surrounding modules can be loosened and moved away from the module to be removed.

It will be appreciated, that although the present embodiment is described as using screws for providing mechanical mounting of the modules, alternative mechanical arrangements such as clips, bayonet fittings and so on could be used. As a further alternative, combined electrical and mechanical arrangements such as zero insertion force connectors, plugs and sockets, could be used.

In the preferred embodiment of the invention, separate electrical connections are achieved by means of ribbon cables 111 which connect to cable connectors 109 provided on the module board 102. The ribbon cable connectors allow the electrical connection of the module 100 to an interface board 309.

In the preferred embodiment of the invention, an interface board 309, comprising power supplies, module system control electronics and a computer interface (optionally also with digital to analog converters) is placed near to one of the edges of the multi-module assembly 330. In this manner, an increase in the thickness of the cassette is avoided. The interface board forms part of or is contained with the imaging cassette.

External connections from the cassette to, for example, an external computer, are provided by means of a conventional external connector (for example a parallel connector) 354, which can be connected via a cable 356 to a computer. As the external connection via the cable 356 to a computer can be relatively long, the interface board 309 can include conventional amplification circuitry for transmission from the signals from the interface board to the computer and for reception of signals therefrom.

Figure 10:
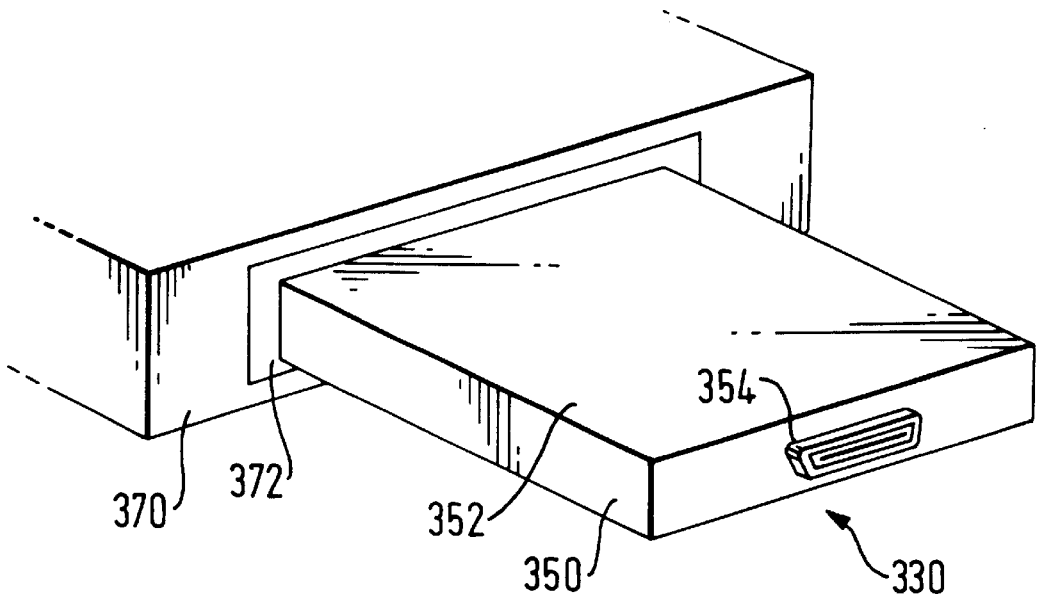
FIG. 10 is a schematic external view of a cassette.

FIG. 10 is a schematic external view of an imaging cassette 330, the cassette comprising an external housing 350, with an x-ray transmissive upper surface 352. FIG. 10 also shows the external connector 354. It will be noted that the external connector is provided on one end of the cassette which, in use, will be visible in the insertion slot 372 of X-ray apparatus 370. Thus, as shown in FIG. 10, the imaging cassette 330 is intended to replace a conventional X-ray film cassette for use in conventional X-ray equipment. Typically, the cassette will have a thickness of 20–30 mm and an external surface of, for example, 180×240 mm (eg, for mammography) or 400×400 mm (eg, for chest x-rays).

Parallax error due to the tilting of the detecting surface with respect to the module and cassette planes can be reduced, by tilting the modules within the cassette plane so as to compensate for the angle between plane of the detector substrate 44 and that of the tile mount PCB 81. This tilting in the example shown in FIG. 7 is equivalent to an elevation of the left end of the module of FIG. 5a. By way of example only, for a total module length of 300 millimeters, a module tilting of 2.5 degrees would raise module left side by 13 millimeters, well within an overall constraint of 25 mm total cassette thickness. An X-ray angle of incidence of 2.5 degrees amounts to a parallax error of 33 micrometers for detector thickness of 750 micrometers.

The total readout time for a cassette depends on the pixel readout/switching rate and the number of tiles on the cassette. In the preferred embodiment of the invention, the output for a megacluster derived by multiplexing cluster outputs in circuitry 106 in the region of the module identified at 104 in FIG. 5b. The overall output rate is increased by a factor equal to the number of megaclusters. In the example implementation described with reference to FIG. 5c, there are four megaclusters. Accordingly, for a pixel readout/switching rate of 5 MHz, the module output rate is 20 MHz. With 144 tiles in the full cassette of FIG. 7, the total number of pixels approaches 18.9 million. Accordingly, for pixel switching rates of 2.5, 5.0, 10.0 MHz, the total approximate readout times are 7.5 seconds, 3.8 seconds and 1.9 seconds, respectively. If only half of the tiles are selected for readout, the readout time is halved for the some clock rate. Preferably, the pixel switching rate should be 2.5 MHz or higher. More preferably, the pixel switching rate should be 5 MHz or higher. Even more preferably, the pixel switching rate should be 10 MHz or higher.

In the preferred embodiment of the invention, the analog multiplexed outputs from each module are further multiplexed in the cassette. In the example implementation of FIG. 6, the analog outputs from each of the six modules are fed into four analog multiplexers on the interface board 309 and the resulting four signals, representing combinations of module output signals, are digitized. The digitisation can be effected by feeding the outputs from the interface board on a multichannel ADC in the control electronics of a computer (for example control electronics as in FIG. 1). Alternatively, video digitisation can be employed.

Thus, in an embodiment of the invention the cassette 330 could form the imaging array 15 of a system as shown in FIG. 1.

Thus there has been described imaging apparatus comprising a modular structure including a first support structure, a plurality of second support structures, and a plurality of imaging devices such that the second support structures are mechanically mounted on the first support structure and a plurality of the imaging devices is mounted on each second support structure.

The imaging device can comprise one or more detecting layers sensitive to radiation and one or more readout layers, the detecting layer(s) and the readout layer(s) being joined together with an image detecting plane or planes of the detector layer(s) substantially parallel to the readout layer(s).

Although exemplary embodiments of the invention have been described, it will be appreciated that the invention in not limited thereto, and that many modifications, substitutions and additions to the embodiments described could be envisaged within the scope of the invention.

Accordingly, although an embodiment of the present invention has been described based on the imaging device technology described in the Applicant's earlier patent applications and patents, the invention is also applicable to imaging devices based on other technologies. For example, the invention is applicable to imaging devices with image detection and readout implemented in a single unitary substrate.

Also, although the ladders, or modules, as described as having a support in the form of a PCB on which the imaging device tiles and further circuit components are mounted, the modules could comprise separate support structures for imaging device tiles and further circuitry, the separate support structures being interconnected by suitable mechanical and electrical connection structures. Also, the mechanical and electrical interconnection of the ladder modules and the cassette can be achieved in any suitable manner.

Also, although particular dimensions for and numbers of individual elements are given for the embodiments described, it will be appreciated that these are merely given by way of example and can be adapted to any particular application and/or technology used in a particular application of the invention. Also, although particular configurations are shown, these may be changed in other embodiments. For example, rather than providing analog outputs from the modules and interface board, analog to digital converters could be provided on the interface board or the modules to provide digitized outputs from the interface board or the modules, respectively. Also, with suitable integration of functions, the discrete components on the interface board and modules may be replaced by a few number of components using large scale integrated circuits (e.g. Application Specific Integrated Circuits (ASICs)). Indeed, it can be envisaged that the interface board could be dispensed with if the functions performed thereby were incorporated in large scale integrated circuits (e.g. ASICs) on the modules.

What I claim is:

1. Apparatus for imaging radiation, said apparatus comprising:
   a plurality of tiles, each tile comprising an imaging device having an array of radiation detector cells;
   a plurality of modules, each module supporting a plurality of said tiles; and
   a module support structure, said support structure supporting said module(s), wherein said modules are removably mounted on said support structure.

2. Apparatus according to claim 1, wherein a said tile is removably mountable to a said module.

3. Apparatus according to claim 1, wherein a said imaging device has a two-dimensional array of radiation detector cells.

4. Apparatus according to claim 1, wherein a said module supports a two-dimensional array of tiles.

5. Apparatus according to claim 1, wherein each said module comprises a board comprising, on a first surface thereof, an array of tile mounting locations, each mounting location comprising an arrangement of mounting location contacts for contacting corresponding tile contacts on a said tile.

6. Apparatus according to claim 5, wherein each board is a multilayer printed circuit board.

7. Apparatus according to claim 5, wherein said board is elongate and comprises two or more rows of mounting locations for supporting two or more rows of tiles.

8. Apparatus according to claim 5, wherein said board has, on said first surface, a circuit region not populated with said tiles.

9. Apparatus according to claim 8, wherein said board, adjacent one end thereof, has, on said first surface, a circuit region not populated with said tiles.

10. Apparatus according to claim 8, wherein said circuit region comprises control circuitry for controlling access to and output of signals from said imaging devices.

11. Apparatus according to claim 10, further comprising circuitry on a surface of said board, opposite to said first surface.

12. Apparatus according to claim 10, wherein conductive tracks connect said mounting location contacts to said circuitry.

13. Apparatus according to claim 12, wherein said circuitry and said conductive tracks are arranged electronically to group tiles into first clusters, imaging devices on said tiles of a said first cluster being read out in a serial manner.

14. Apparatus according to claim 13, wherein said first electronic clusters are electronically grouped in second electronic clusters, a said second electronic cluster comprising one or more first electronic clusters read out in a serial manner.

15. Apparatus according to claim 14, comprising electronic switch circuitry for determining which of said first clusters are combined for a said second cluster.

16. Apparatus according to claim 15, wherein said switches are mounted on a surface of said board opposite to said first surface.

17. Apparatus according to claim 15, wherein said switches are arranged to provide selective deactivation of said first clusters.

18. Apparatus according to claim 14, configured to read out plural said second clusters read out in parallel.

19. Apparatus according to claim 1, wherein a said imaging device tile comprises:
   a said imaging device and a mount, an image detecting plane of said imaging device being tilted with respect to a mounting surface of said mount, said mounting surface comprising tile electrical contacts interconnectable with corresponding mounting location contacts at a tile mounting location on said module.

20. Apparatus according to claim 19, wherein said modules are tilted at least partially to compensate for tilting of said image detector planes.

21. Apparatus according to claim 19, wherein said imaging device comprises one or more detecting layers sensitive to radiation and one or more readout layers, said detecting layer(s) and said readout layer(s) being joined together with an image detecting plane or planes of said detector layer(s) substantially parallel to said readout layer(s).

22. Apparatus according to claim 21, wherein said detecting layer extends beyond said readout layer on at least two edges, a further edge providing wire connections between said readout layer and said mount.

23. Apparatus according to claim 19, comprising a wedge between said imaging device and said mount to maintain an angle between said image detecting plane of said imaging device and said mounting surface of said mount.

24. Apparatus according to claim 1, wherein said modules are elongate and said support structure supports a one-dimensional array of said modules aligned next to each other.

25. Apparatus according to claim 24, wherein said imaging devices of adjacent modules are in mechanical contact with each other.

26. Apparatus according to claim 24, wherein each said module comprises a planar board and adjacent modules are alternately displaced in a first direction and in an opposite direction, said first and opposite directions being substantially perpendicular to the plane of each said board.

27. Apparatus according to claim 1, further comprising an interface board comprising interface circuitry, said modules being electrically connected to said interface board.

28. An apparatus according to claim 27, wherein said interface circuitry comprises circuitry for multiplexing outputs from respective modules.

29. Apparatus according to claim 1 comprising an imaging cassette.

30. Apparatus according to claim 29, wherein said imaging cassette comprises an external connector for connecting said imaging cassette to an external processor.

31. Apparatus according to claim 29, wherein said cassette comprises a housing, said support structure being integral to said housing.

32. Apparatus according to claim 29, wherein said cassette comprises a housing, said support structure contained within said housing.

33. Apparatus according to claim 29, wherein said cassette comprises housing having an X-ray transmissive surface.

34. An imaging system comprising apparatus according to claim 29 and control electronics and/or an image processor for processing signals output from said cassette.

35. A module for use in apparatus according to claim 1, for mounting an array of tiles, each tile comprising an imaging device having an array of radiation detector cells and having a plurality of tile contacts on a mounting surface thereof, wherein said module

- a board having, on a first surface thereof, an array of tile mounting locations, each mounting location comprising an arrangement of mounting location contacts for contacting corresponding tile contacts on a tile and means permitting removable mounting of said tile at said tile mounting location;
- circuitry for controlling access to and output of signals from respective tiles when mounted at said tile mounting locations;
- electrical connections from said mounting location contacts to said circuitry; and
- means for mounting said module on a support structure for a plurality of such modules.

36. A module according to claim 35, wherein said board is a multilayer printed circuit board, conductive tracks connecting said mounting location contacts to said circuitry.

37. A module according to claim 35, wherein said board, adjacent one end thereof, has, on said first surface, a circuit region comprising said circuitry for controlling access to and output of signals from respective tiles when mounted on said board.

38. A module according to claim 35, comprising circuitry on a surface of said board opposite to said first surface.

39. A module according to claim 35, wherein said circuitry comprises an analog to digital converter stage.

40. A method of forming an imaging array for imaging radiation comprising:

- mounting a plurality of tiles on an imaging module, each tile comprising an imaging device having an array of radiation detector cells; and
- mounting a plurality of said modules on an imaging support, each module supporting a plurality of said tiles.

* * * * *